United States Patent
Everett et al.

(10) Patent No.: US 6,575,372 B1
(45) Date of Patent: Jun. 10, 2003

(54) SECURE MULTI-APPLICATION IC CARD SYSTEM HAVING SELECTIVE LOADING AND DELETING CAPABILITY

(75) Inventors: David Barrington Everett, East Sussex (GB); Stuart James Miller, Berks (GB); Anthony David Peacham, Kent (GB); Ian Stephens Simmons, Cambs (GB); Timothy Philip Richards, Herts (GB); John Charles Viner, Surrey (GB)

(73) Assignee: Mondex International Limited, London (GB)

( * ) Notice: Subject to any disclaimer, the term of this patent is extended or adjusted under 35 U.S.C. 154(b) by 0 days.

(21) Appl. No.: 09/023,057

(22) Filed: Feb. 12, 1998

Related U.S. Application Data

(60) Provisional application No. 60/046,514, filed on May 14, 1997.

(30) Foreign Application Priority Data

Feb. 21, 1997 (GB) .............................................. 9703591

(51) Int. Cl.⁷ .............................................. G06K 19/06
(52) U.S. Cl. ...................................................... 235/492
(58) Field of Search ................................ 235/380, 379, 235/492; 705/41

(56) References Cited

U.S. PATENT DOCUMENTS

| | | |
|---|---|---|
| 4,214,230 A | 7/1980 | Fak et al. |
| 4,218,582 A | 8/1980 | Hellman et al. |
| 4,259,720 A | 3/1981 | Campbell |
| 4,302,810 A | 11/1981 | Bouricius et al. |
| 4,305,059 A | 12/1981 | Benton |
| 4,321,672 A | 3/1982 | Braun et al. |
| 4,341,951 A | 7/1982 | Benton |
| 4,405,829 A | 9/1983 | Rivest et al. |
| 4,408,203 A | 10/1983 | Campbell |
| 4,423,287 A | 12/1983 | Zeidler |

(List continued on next page.)

FOREIGN PATENT DOCUMENTS

| | | |
|---|---|---|
| EP | 0152024 | 8/1985 |
| EP | 0157303 | 10/1985 |
| EP | 0190733 | 8/1986 |
| EP | 0218176 | 4/1987 |
| EP | 0261030 | 3/1988 |

(List continued on next page.)

OTHER PUBLICATIONS

José Zoreda and José Otów *Smart Cards*, Artec House, 1994, pp. 124–127.*
W. Rankl and W. Effing *Smart Card Handbook* John Wiley & Sons 1997, pp. 302–305.*
Davies et al., "Security for Computer Networks: An Introduction to Data Security in Teleprocessing and Electronic Funds Transfer," John Wiley & Sons 1984.

*Primary Examiner*—Mark Tremblay
(74) *Attorney, Agent, or Firm*—Baker Botts LLP

(57) ABSTRACT

A multi-application IC card system is disclosed having selective application loading and deleting capability. Prior to loading an application onto an IC card a test is conducted to determine if the card is qualified to receive the application using personalization data stored on the card and comparing it with permissions data associated with the application indicating one or more sets of cards upon which the application may be loaded. If the personalization data of the card falls within the allowable set of permissions for that application then the card may be loaded with the application. Preferably, the personalization data includes data representative of the card number, issuer, a product class and the date on which the card is personalized.

1 Claim, 11 Drawing Sheets

U.S. PATENT DOCUMENTS

| | | | |
|---|---|---|---|
| 4,442,345 | A | 4/1984 | Mollier et al. |
| 4,453,074 | A | 6/1984 | Weinstein |
| 4,467,139 | A | 8/1984 | Mollier |
| 4,498,000 | A | 2/1985 | Decavele et al. |
| 4,536,647 | A | 8/1985 | Atalla et al. |
| 4,578,530 | A | 3/1986 | Zeidler |
| 4,605,820 | A | 8/1986 | Campbell, Jr. |
| 4,629,872 | A | 12/1986 | Hällberg |
| 4,630,201 | A | 12/1986 | White |
| 4,650,978 | A | 3/1987 | Hudson et al. |
| 4,669,596 | A | 6/1987 | Capers et al. |
| 4,705,211 | A | 11/1987 | Honda et al. |
| 4,709,136 | A | 11/1987 | Watanabe |
| 4,709,137 | A | 11/1987 | Yoshida |
| 4,727,243 | A | 2/1988 | Savar |
| 4,727,244 | A | 2/1988 | Nakano et al. |
| 4,731,842 | A | 3/1988 | Smith |
| 4,734,568 | A | 3/1988 | Watanabe |
| 4,736,094 | A | 4/1988 | Yoshida |
| 4,742,215 | A | 5/1988 | Daughters et al. |
| 4,745,267 | A | 5/1988 | Davis et al. |
| 4,746,788 | A | 5/1988 | Kawana |
| 4,748,557 | A | 5/1988 | Tamada et al. |
| 4,748,668 | A | 5/1988 | Shamir et al. |
| 4,752,677 | A | 6/1988 | Nakano et al. |
| 4,757,185 | A | 7/1988 | Onishi |
| 4,757,543 | A | 7/1988 | Tamada et al. |
| 4,759,063 | A | 7/1988 | Chaum |
| 4,759,064 | A | 7/1988 | Chaum |
| 4,767,920 | A | 8/1988 | Kitta et al. |
| 4,778,983 | A | 10/1988 | Ushikubo |
| 4,785,166 | A | 11/1988 | Kushima |
| 4,786,790 | A | 11/1988 | Kruse et al. |
| 4,797,542 | A | 1/1989 | Hara |
| 4,797,920 | A | 1/1989 | Stein |
| 4,798,941 | A | 1/1989 | Watanabe |
| 4,802,218 | A | 1/1989 | Wright et al. |
| 4,803,347 | A | 2/1989 | Sugahara et al. |
| 4,811,393 | A | 3/1989 | Hazard |
| 4,816,653 | A | 3/1989 | Anderl et al. |
| 4,816,654 | A | 3/1989 | Anderl et al. |
| 4,825,052 | A | 4/1989 | Chemin et al. |
| 4,831,245 | A | 5/1989 | Ogasawara |
| 4,833,595 | A | 5/1989 | Iijima |
| 4,839,504 | A | 6/1989 | Nakano |
| 4,839,792 | A | 6/1989 | Iijima |
| 4,849,614 | A | 7/1989 | Watanabe et al. |
| 4,853,522 | A | 8/1989 | Ogasawara |
| 4,853,961 | A | 8/1989 | Pastor |
| 4,874,935 | A | 10/1989 | Younger |
| 4,877,945 | A | 10/1989 | Fujisaki |
| 4,877,947 | A | 10/1989 | Mori |
| 4,879,747 | A | 11/1989 | Leighton et al. |
| 4,882,474 | A | 11/1989 | Anderl et al. |
| 4,887,234 | A | 12/1989 | Iijima |
| 4,891,503 | A | 1/1990 | Jewell |
| 4,891,506 | A | 1/1990 | Yoshimatsu |
| 4,900,904 | A | 2/1990 | Wright et al. |
| 4,901,276 | A | 2/1990 | Iijima |
| 4,906,838 | A | 3/1990 | Halpern |
| 4,907,270 | A | 3/1990 | Hazard |
| 4,926,480 | A | 5/1990 | Chaum |
| 4,935,962 | A | 6/1990 | Austin |
| 4,949,257 | A | 8/1990 | Orbach ...................... 364/401 |
| 4,961,142 | A | 10/1990 | Elliott et al. |
| 4,969,188 | A | 11/1990 | Schöbi |
| 4,977,595 | A | 12/1990 | Ohta et al. |
| 4,984,270 | A | 1/1991 | LaBounty |
| 4,985,615 | A | 1/1991 | Iijima |
| 4,987,593 | A | 1/1991 | Chaum |
| 4,993,068 | A | 2/1991 | Piosenka et al. |
| 4,995,081 | A | 2/1991 | Leighton et al. |
| 4,996,711 | A | 2/1991 | Chaum |
| 5,001,753 | A | 3/1991 | Davio et al. |
| 5,003,594 | A | 3/1991 | Shinagawa |
| 5,005,200 | A | 4/1991 | Fischer |
| 5,010,239 | A | 4/1991 | Mita |
| 5,012,074 | A | 4/1991 | Masada |
| 5,012,076 | A | 4/1991 | Yoshida |
| 5,014,312 | A | 5/1991 | Lisimaque et al. |
| 5,016,274 | A | 5/1991 | Micali et al. |
| 5,038,025 | A | 8/1991 | Kodera |
| 5,068,894 | A | 11/1991 | Hoppe |
| 5,093,862 | A | 3/1992 | Scwartz |
| 5,097,115 | A | 3/1992 | Ogasawara et al. |
| 5,120,939 | A | 6/1992 | Claus et al. |
| 5,128,997 | A | 7/1992 | Pailles et al. |
| 5,131,038 | A | 7/1992 | Puhl et al. |
| 5,142,578 | A | 8/1992 | Matyas et al. |
| 5,146,499 | A | 9/1992 | Geffrotin |
| 5,148,481 | A | 9/1992 | Abraham et al. |
| 5,161,231 | A | 11/1992 | Iijima |
| 5,162,989 | A | 11/1992 | Matsuda ...................... 364/401 |
| 5,163,098 | A | 11/1992 | Dahbura |
| 5,164,988 | A | 11/1992 | Matyas et al. |
| 5,165,043 | A | 11/1992 | Miyahara et al. |
| 5,166,503 | A | 11/1992 | Mizuta |
| 5,175,416 | A | 12/1992 | Mansvelt et al. |
| 5,180,901 | A | 1/1993 | Hiramatsu |
| 5,191,193 | A | 3/1993 | Le Roux |
| 5,191,608 | A | 3/1993 | Geronimi |
| 5,200,999 | A | 4/1993 | Matyas et al. |
| 5,201,000 | A | 4/1993 | Matyas et al. |
| 5,202,922 | A | 4/1993 | Iijima |
| 5,214,702 | A | 5/1993 | Fischer |
| 5,224,162 | A | 6/1993 | Okamoto et al. |
| 5,243,175 | A | 9/1993 | Kato |
| 5,247,578 | A | 9/1993 | Pailles et al. |
| 5,293,577 | A | 3/1994 | Hueske et al. |
| 5,371,797 | A | 12/1994 | Bocinsky, Jr. |
| 5,420,405 | A | 5/1995 | Chasek |
| 5,452,431 | A | 9/1995 | Bournas |
| 5,473,690 | A | 12/1995 | Grimonprez et al. |
| 5,485,520 | A | 1/1996 | Chaum et al. |
| 5,511,121 | A | 4/1996 | Yacobi |
| 5,517,011 | A | 5/1996 | Vandenengel |
| 5,530,232 | A | 6/1996 | Taylor |
| 5,534,857 | A | 7/1996 | Laing et al. |
| 5,539,825 | A | 7/1996 | Akiyama et al. |
| 5,542,081 | A | 7/1996 | Geronimi |
| 5,544,246 | A | 8/1996 | Mandelbaum et al. |
| 5,546,523 | A | 8/1996 | Gatto |
| 5,557,516 | A | 9/1996 | Hogan |
| 5,574,269 | A | 11/1996 | Mori et al. |
| 5,578,808 | A | 11/1996 | Taylor |
| 5,581,708 | A | 12/1996 | Iijima |
| 5,588,146 | A | 12/1996 | Leroux |
| 5,644,638 | A | * 7/1997 | Thiriet ...................... 380/25 |
| 5,682,027 | A | 10/1997 | Bertina et al. |
| 5,692,132 | A | 11/1997 | Hogan |
| 5,699,528 | A | 12/1997 | Hogan |
| 5,704,046 | A | 12/1997 | Hogan |
| 5,705,798 | A | 1/1998 | Tarbox |
| 5,708,780 | A | 1/1998 | Levergood et al. |
| 5,715,314 | A | 2/1998 | Payne et al. |
| 5,724,424 | A | 3/1998 | Gifford |
| 5,729,717 | A | * 3/1998 | Tamada et al. ............. 711/164 |
| 5,802,519 | A | * 9/1998 | Jong ........................ 707/100 |
| 5,825,875 | A | 10/1998 | Ugon |
| 5,889,941 | A | * 3/1999 | Tushie et al. ................ 235/380 |
| 5,923,884 | A | * 7/1999 | Peyret et al. ................... 7/199 |

FOREIGN PATENT DOCUMENTS

| | | |
|---|---|---|
| EP | 0275510 | 7/1988 |
| EP | 0292248 | 11/1988 |
| EP | 0325506 | 1/1989 |
| EP | 0328289 | 8/1989 |
| EP | 0354793 | 2/1990 |
| EP | 0451936 | 10/1991 |
| EP | WO9116691 | 10/1991 |
| EP | 0466969 | 1/1992 |
| EP | 0475837 | 3/1992 |
| EP | 0547741 | 9/1992 |
| EP | 0537756 | 4/1993 |
| EP | 0540095 | 5/1993 |
| EP | 0559205 | 8/1993 |
| EP | 0588339 | 3/1994 |
| EP | 0594493 | 4/1994 |
| EP | 0636998 | 2/1995 |
| EP | 0647902 | 4/1995 |
| EP | 0686947 | 5/1995 |
| EP | 0666550 | 8/1995 |
| EP | 0707290 | 9/1995 |
| EP | 0751460 | 1/1997 |
| FR | 2536928 | 6/1984 |
| FR | 2667171 | 3/1992 |
| FR | 2687816 | 8/1993 |
| GB | 2284689 | 6/1995 |
| JP | 64-81084 | 3/1989 |
| JP | 2592856 | 12/1996 |
| WO | WO8707062 | 11/1987 |
| WO | WO8809019 | 11/1988 |
| WO | WO9005960 | 5/1990 |
| WO | WO9213322 | 8/1992 |
| WO | WO9320538 | 10/1993 |
| WO | WO9321612 | 10/1993 |
| WO | WO9522810 | 8/1995 |
| WO | WO9619771 | 6/1996 |
| WO | WO9628795 | 9/1996 |
| WO | WO9638825 | 12/1996 |
| WO | WO9843212 | 10/1998 |
| WO | WO9101538 | 2/1999 |
| WO | WO9910824 | 3/1999 |
| WO | WO9916031 | 4/1999 |

\* cited by examiner

SECURE MULTI-APPLICATION IC CARD SYSTEM HAVING SELECTIVE LOADING AND DELETING CAPABILITY

PRIORITY APPLICATION

This application claims priority to Great Britain patent application no. 9703591.9 filed on Feb. 21, 1997, and entitled "Multiple Application Computer System" (which is hereby incorporated by reference) and to United States Provisional application No. 60/046,514 filed on May 15, 1997, and entitled "Design for a Multi Application Smart Card."

BACKGROUND OF INVENTION

Integrated circuit ("IC") cards are becoming increasingly used for many different purposes in the world today. An IC card (also called a smart card) typically is the size of a conventional credit card which contains a computer chip including a mircroprocessor, read-only-memory (ROM), electrically erasable programmable read-only-memory (EEPROM), an Input/Output (I/O) mechanism and other circuitry to support the microprocessor in its operations. An IC card may contain a single application or may contain multiple independent applications in its memory. MULTOS™ is a multiple application operating system which runs on IC cards, among other platforms, and allows multiple applications to be executed on the card itself. This allows a card user to run many programs stored in the card (for example, credit/debit, electronic money/purse and/or loyalty applications) irrespective of the type of terminal (i.e., ATM, telephone and/or POS) in which the card is inserted for use.

A conventional single application IC card, such as a telephone card or an electronic cash card, is loaded with a single application at its personalization stage. That application, however, cannot be modified or changed after the card is issued even if the modification is desired by the card user or card issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy and inconvenient.

Therefore, it is beneficial to store multiple applications on the same IC card. For example, a card user may have both a purse application and a credit/debit application on the same card so that the user could select which type of payment (by electronic cash or credit card) to use to make a purchase. Multiple applications could be provided to an IC card if sufficient memory exists and an operating system capable of supporting multiple applications is present on the card. Although multiple applications could be pre-selected and placed in the memory of the card during its production stage, it would also be beneficial to have the ability to load and delete applications for the card post-production as needed.

The increased flexibility and power of storing multiple applications on a single card create new challenges to be overcome concerning the integrity and security of the information (including application code and associated data) exchanged between the individual card and the application provider as well as within the entire system when loading and deleting applications. It would be beneficial to have the capability in the IC card system to exchange data among cards, card issuers, system operators and application providers securely and to load and delete applications securely at any time from either a terminal or remotely over a telephone line, internet or intranet connection or other data conduit. Because these data transmission lines are not typically secure lines, a number of security and entity-authentication techniques must be implemented to make sure that applications being sent over the transmission lines are only loaded on the intended cards.

As mentioned, it is important—particularly where there is a continuing wide availability of new applications to the cardholder—that the system has the capability of adding applications onto the IC card subsequent to issuance. This is necessary to protect the longevity of the IC cards; otherwise, once an application becomes outdated, the card would be useless. In this regard, to protect against the improper or undesired loading of applications onto IC cards, it would be beneficial for the IC card system to have the capability of controlling the loading process and restricting, when necessary or desirable, the use of certain applications to a limited group or number of cards such that the applications are "selectively available" to the IC-cards in the system. This "selective capability" would allow the loading and deleting of applications at, for example, a desired point in time in the card's life cycle. It would also allow the loading of an application only to those cards chosen to receive the selected application.

Accordingly, it is an object of this invention to provide these important features and specifically a secure IC-card system that allows for selective availability of smart card applications which may be loaded onto IC cards.

SUMMARY OF THE INVENTION

These and other objectives are achieved by the present invention which provides an IC card system comprising at least one IC card and an application to be loaded onto the card wherein the IC card contains card personalization data and the application is assigned application permissions data designating which IC card or group of IC cards upon which the application may be loaded. The system checks to determine whether the card's personalization data falls within the permissible set indicated by the application's permissions data. If it does, the application may be loaded onto the card.

In a preferred embodiment, the card personalization data is transferred onto the card by the personalization bureau after the card is manufactured. The data preferably includes data representing the card number, the issuer, product class (i.e., such as gold or platinum cards), and the date on which the card was personalized. The card further preferably contains enablement data indicating whether or not the card has been enabled with personalized data.

In a further preferred embodiment, the IC card secure system checks the enablement data prior to loading an application to determine whether or not the card has been enabled. Preferably, if the card has been enabled, the system checks if the card number, the issuer, the product class and/or the date on which the card was personalized are within the acceptable set indicated by the application's permissions data. If so, the application may be loaded onto the IC card.

In yet another preferred embodiment, the application's permissions data may contain data representative of a blanket permission such that all cards would pass for application loading.

BRIEF DESCRIPTION OF THE DRAWINGS

Further objects, features and advantages of the invention will become apparent from the following detailed description taken in conjunction with the accompanying figures showing illustrative embodiments of the invention, in which.

Figure 1:
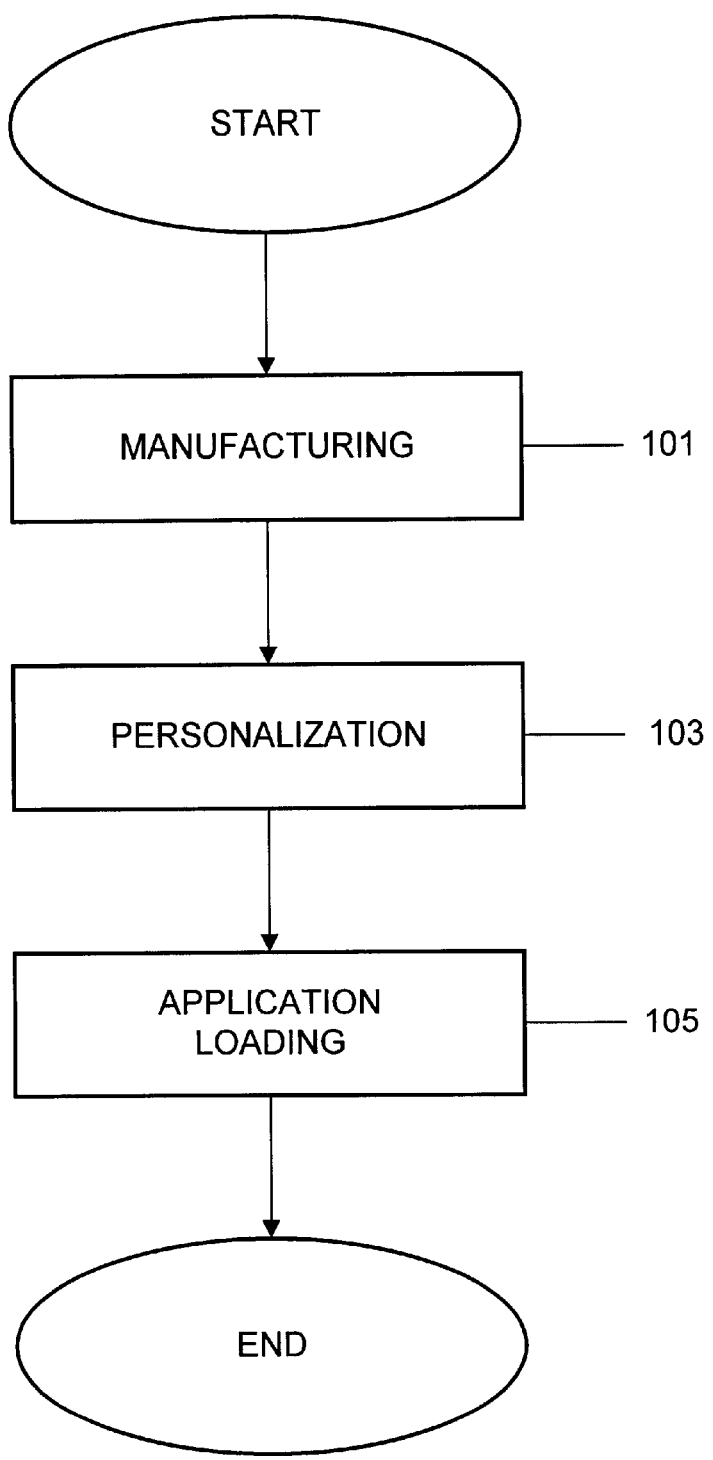
FIG. 1 is block diagram illustrating the three stages in the life of a multi-application IC card in a secure system.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

The present invention provides an IC card system and process which allow the flexibility to load and delete selected applications over the lifetime of a multi-application IC card in response to the needs or desires of the card user, card issuers and/or application developers. A card user who has such a card can selectively load and delete applications as desired if allowed by the card issuer in conjunction with the system operator or Certification Authority ("CA") which controls the loading and deleting process by certifying the transfer of information relating to the process.

By allowing applications to be selectively loaded and deleted from the card, a card issuer can extend additional functionality to an individual IC card without having to issue new cards. Moreover, application developers can replace old applications with new enhanced versions, and applications residing on the same card using a common multiple application operating system may interact and exchange data in a safe and secure manner. For example, a frequent flyer loyalty program may automatically credit one frequent flyer mile to a card user's internal account for every dollar spent with the Mondex purse or with a credit/debit application. By allowing the ability to selectively load and delete applications, the card user, subject to the requirements of the card issuer, also has the option of changing loyalty programs as desired.

A card issuer or application developer may intend that a particular application be loaded on only one card for a particular card user in a card system. A regional bank may desire to have a proprietary application reside only on the cards which the bank issues. The present invention would allow for this selective loading and specifically allow for the prevention of loading proprietary applications onto unauthorized cards issued by others.

To achieve these desired objectives, the present invention gives each card a specific identity by storing "card personalization data" on the card. Moreover, each application to be loaded or deleted on one or more cards in the system is assigned "application permissions data" which specify the cards upon which the applications may be loaded.

The type of personalized data can vary depending upon the needs and requirements of the card system. In the preferred embodiment, described in greater detail below, the personalization data include unique card identification designation data, the card issuer, the product class or type (which is defined by the card issuer) and the date of personalization. However, not all of these data elements are required to be used and additional elements could also be included.

The application permissions data associated with an application, also described in greater detail below, can be a single value in an identity field or could include multiple values in the identity field. For example, the application permissions data in the card issuer field could represent both product class A and product class B from a certain Bank X, indicating that the application could be loaded onto cards designated as product classes A and B issued by Bank X (as indicated in the card product ID field of the card's personalization data).

In addition, a "global value" could be stored in the issuer field (or other field) of the application permissions data indicating that all IC cards in the system regardless of who issued the card would match this permissions field. In this case, for example, a data value of zero stored in the application permissions card-issuer field will match all of the cards' personalization card-issuer fields.

FIG. 1 shows the three steps involved in providing an operational multi-application IC card in a secure system. The first step is the card manufacturing step 101. The second step is the personalization step 103 where card personalization data (also called entity authentication data) is loaded onto the card. The third step is the application loading step 105 which checks to see if a card is qualified to receive an application, i.e., when the personalization data is checked against the application permissions data associated with the application to be loaded. Each of these three steps is described in detail below.

Card Manufacture

Figure 2:
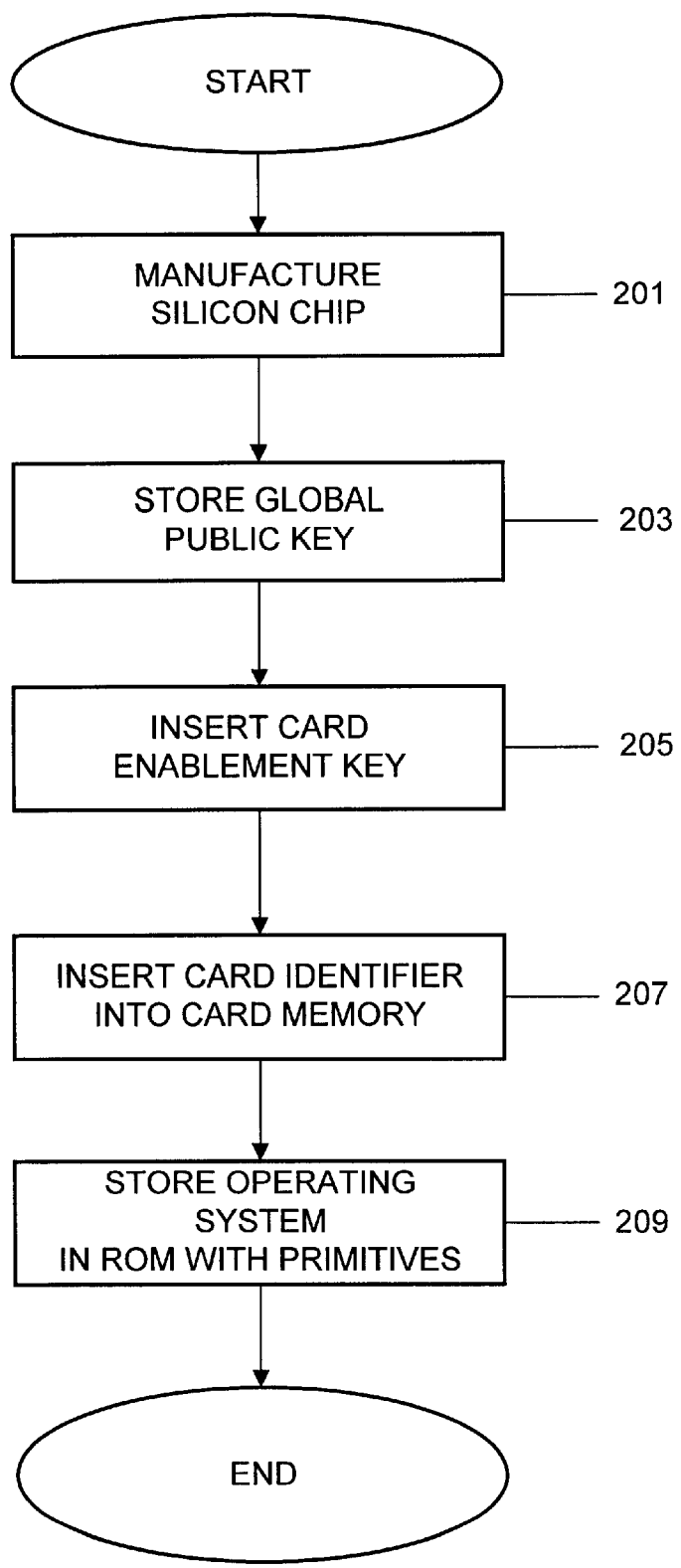
FIG. 2 is a block diagram illustrating the steps of the card manufacture process.

FIG. 2 shows the steps necessary in manufacturing an IC card in a secure system. Step 201 manufactures the physical IC card by creating the integrated circuit on silicon and placing it on the card. The integrated circuit chip will include RAM, ROM and EEPROM memories. When the card is first manufactured, a global public key of the system operator (in this case called the Certification Authority (CA)) is stored on each card in ROM in step 203. This will allow the card to authenticate that the source of any message to it is from the CA since the public key on the card will be matched to the CA's secret key.

More specifically, this public key stored on the card will allow the individual card to verify data signed with the CA's private key. The public key of the CA, which is stored on the card, is used only for determining if the data sent to the card was signed with the proper CA private key. This allows the card to verify the source of any message coming from the CA.

Step 205 inserts a card enablement key in a secure portion of EEPROM in the card to facilitate card specific confidentiality during enablement, and step 207 inserts a card identifier in EEPROM of the card. The identifier, which can be accessed by any terminal, will allow the system to determine the identity of the card in later processes. The identifier is freely available and will not be used to authenticate messages.

Step 209 stores the operating system code in ROM on the card including any primitives which are called or supported by the operating system. The primitives are written in native language code (e.g., assembly language) and are stored in ROM. The primitives are subroutines which may be called by the operating system or by applications residing on the card such as mathematic functions (multiply or divide), data retrieval, data manipulation or cryptographic algorithms. The primitives can be executed very quickly because they are written in the native language of the processor.

After the IC cards are manufactured, they are sent to a personalization bureau ("PB") to enable and personalize the card by storing card personalization data in the memory of the card. The terms enablement and personalization are used interchangeably herein to indicate the preparatory steps taken to allow the card to be loaded securely with an application. The individual cards are preferably manufactured in batches and are sent to a personalization bureau in a group for processing.

Card Enablement/Personalization

Figure 3:
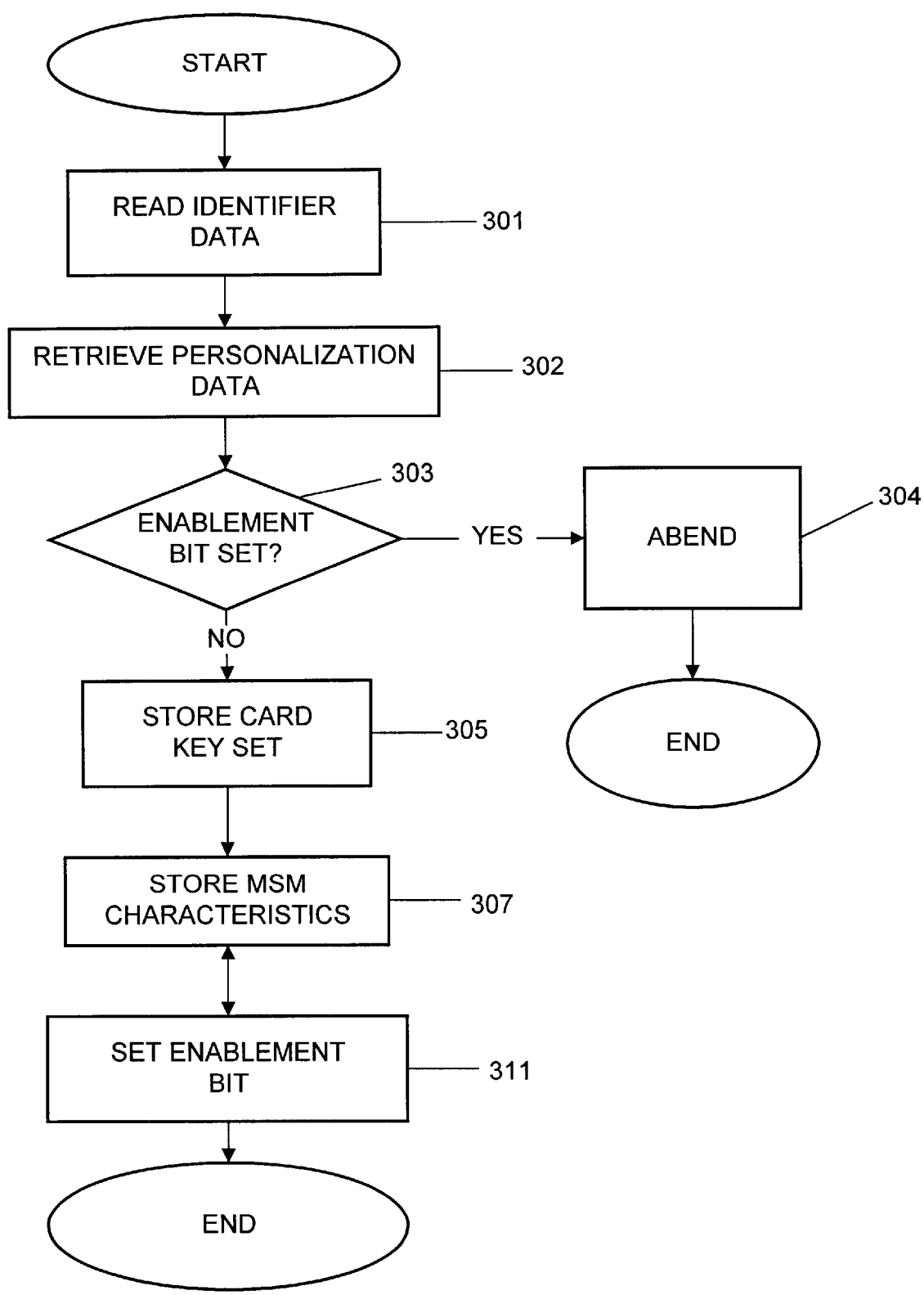
FIG. 3 is a flow diagram illustrating the steps involved in enabling each of the IC cards in the secure system.

FIG. 3 shows the steps of the card enablement process when the card arrives at a personalization bureau. The personalization bureau may be the card issuer (e.g., a bank or other financial institution) or may be a third party that performs the service for the card issuer. The personalization bureau configures the card to a specific user or user class.

FIG. 3 specifically shows the steps taken to enable and personalize each IC card which will work within the system. The cards can be placed in a terminal which communicates with IC cards and which reads the card identifier data (previously placed on the card during the manufacturing process—see step 207). This card identification data is read from the card in step 301. The terminal will effectively send a "get identification data" command to the card and the card will return the identification data to the terminal.

The PB typically processes a group of cards at the same time, and will first compile a list of IC card identification data for the group of cards it is personalizing. The PB then sends electronically (or otherwise) this list of identification data to the Certification Authority ("CA") which creates a personalization (or enablement) data block for each card identifier. The data block includes the card personalization data organized in a number of identity fields and an individual key set for the card, discussed below. These data blocks are then encrypted and sent to the PB in step 302. By using the card identification data, the PB then matches the cards with the encrypted data blocks and separately loads each data block onto the matched card. To insure that the CA controls the identity of the card and the integrity of the system, the PB never obtains knowledge of the content of the data blocks transferred. Some aspects of the personalization are requested by the card issuer to the CA in order to affect their preferred management of the cards they issue. The following additional steps are performed.

Step 303 first checks to see if an enablement bit stored in EEPROM of the card has been already set. If it already has been set, the card has already been configured and personalized and the enablement process will end as shown in step 304. A card cannot be enabled and personalized twice. If the bit has not been set, then the process continues with step 305.

In step 305, the individualized card key set for the card being enabled (which key set is generated at the CA) is stored on the card. The keys can be used later in off-card verification (i.e., to verify that the card is an authentic card). This verification is necessary to further authenticate the card as the one for which the application was intended.

Step 307 generates four different MULTOS Security Manager (MSM) characteristic data elements (otherwise referred to herein as personalization data) for the card at the CA which are used for securely and correctly loading and deleting applications from a particular card. The MSM characteristics also allow for the loading of applications on specific classes of identified cards. (These MSM characteristics are further described in connection with FIG. 5.)

Other data can also be stored on the card at this time as needed by the system design such as an address table or further subroutines.

Step 311 sets the enablement bit in EEPROM of the card which indicates that the enablement process has been completed for the particular card. When this bit is set, another enablement process cannot occur on the card. This ensures that only one personalization and enablement process will occur to the card thus preventing illegal tampering of the card or altering the card by mistake. In the preferred embodiment, the enablement bit is initially not set when the card is manufactured and is set at the end of the enablement process.

Figure 4:
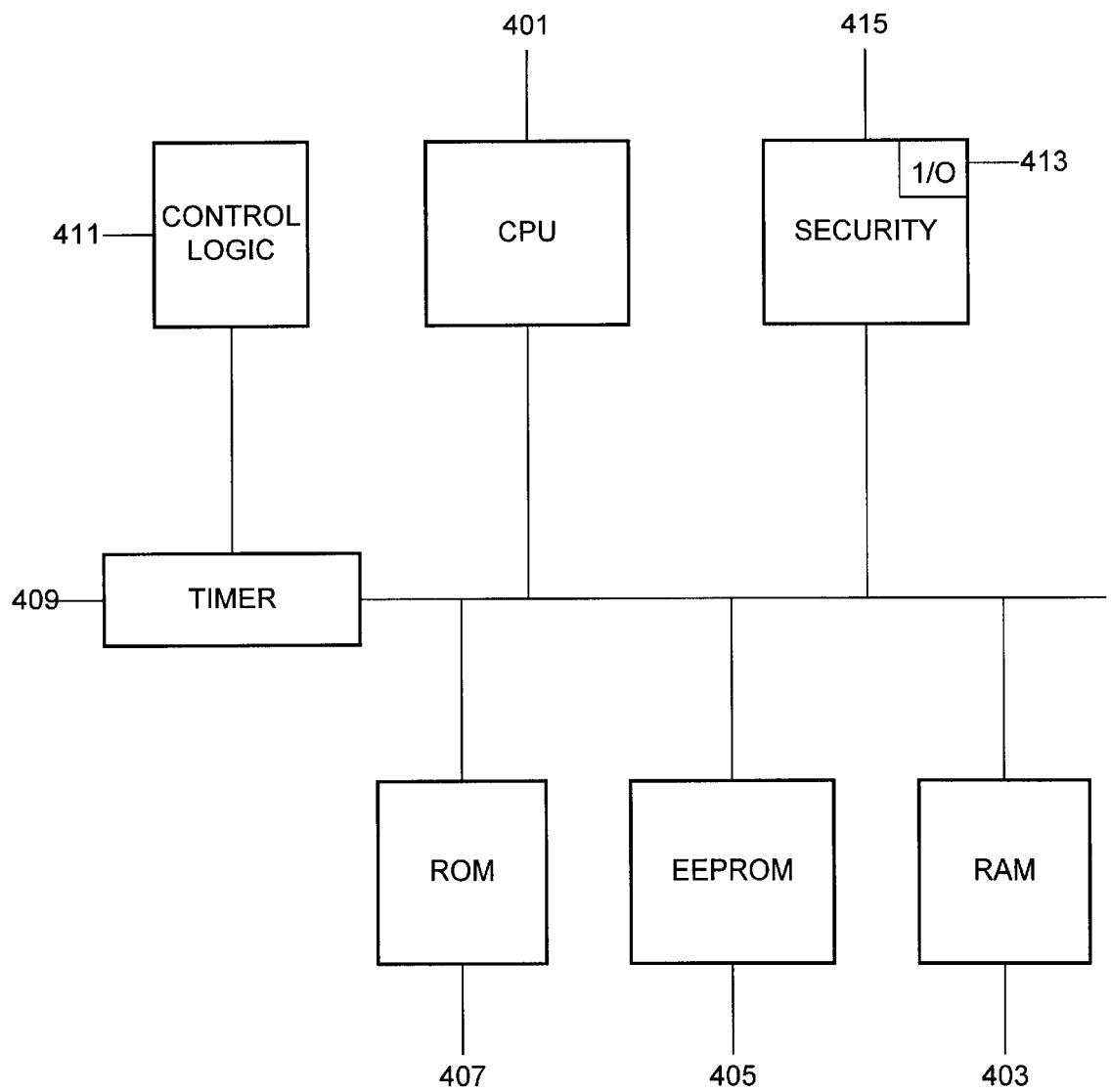
FIG. 4 is a block diagram of an IC card chip which can be used in accordance with the invention.

FIG. 4 shows an example of a block diagram of an IC card chip which has been manufactured and personalized. The IC card chip is located on an IC card for use. The IC card preferably includes a central processing unit 401, a RAM 403, a EEPROM 405, a ROM 407, a timer 409, control logic 411, an I/O ports 413 and security circuitry 415, which are connected together by a conventional data bus.

Control logic 411 in memory cards provides sufficient sequencing and switching to handle read-write access to the card's memory through the input/output ports. CPU 401 with its control logic can perform calculations, access memory locations, modify memory contents, and manage input/output ports. Some cards have a coprocessor for handling complex computations like cryptographic algorithms. Input/output ports 413 are used under the control of a CPU and control logic alone, for communications between the card and a card acceptance device. Timer 409 (which generates or provides a clock pulse) drives the control logic 411 and CPU 401 through the sequence of steps that accomplish memory access, memory reading or writing, processing, and data communication. A timer may be used to provide application features such as call duration. Security circuitry 415 includes fuisible links that connect the input/output lines to internal circuitry as required for testing during manufacture, but which are destroyed ("blown") upon completion of testing to prevent later access. The personalization data to qualify the card is stored in a secured location of EEPROM 405. The comparing of the personalization data to applications permissions data is performed by the CPU 401.

Figure 5:
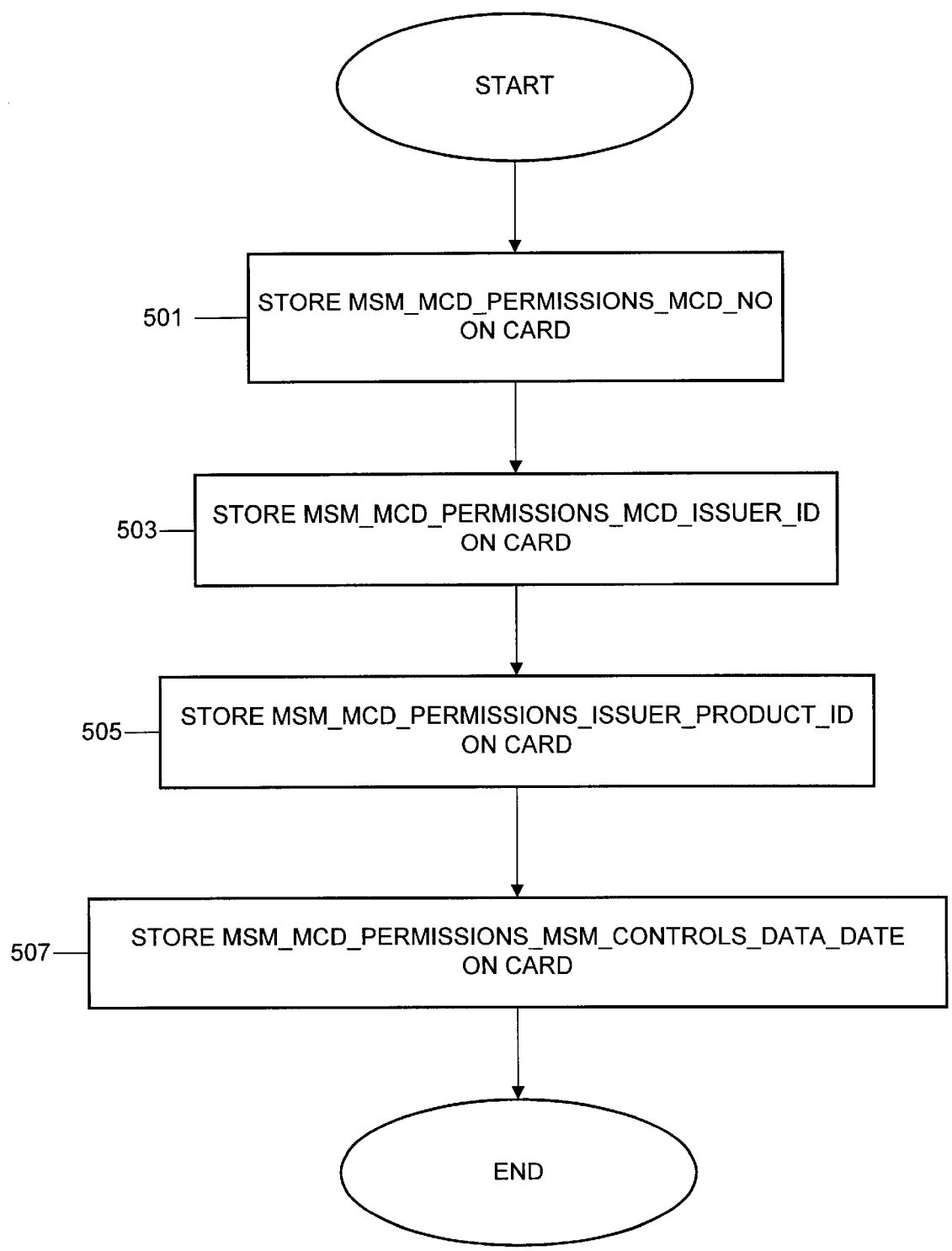
FIG. 5 is a block diagram illustrating the data stored on the IC card as indicated in block 307 of FIG. 3.
Figure 5A:
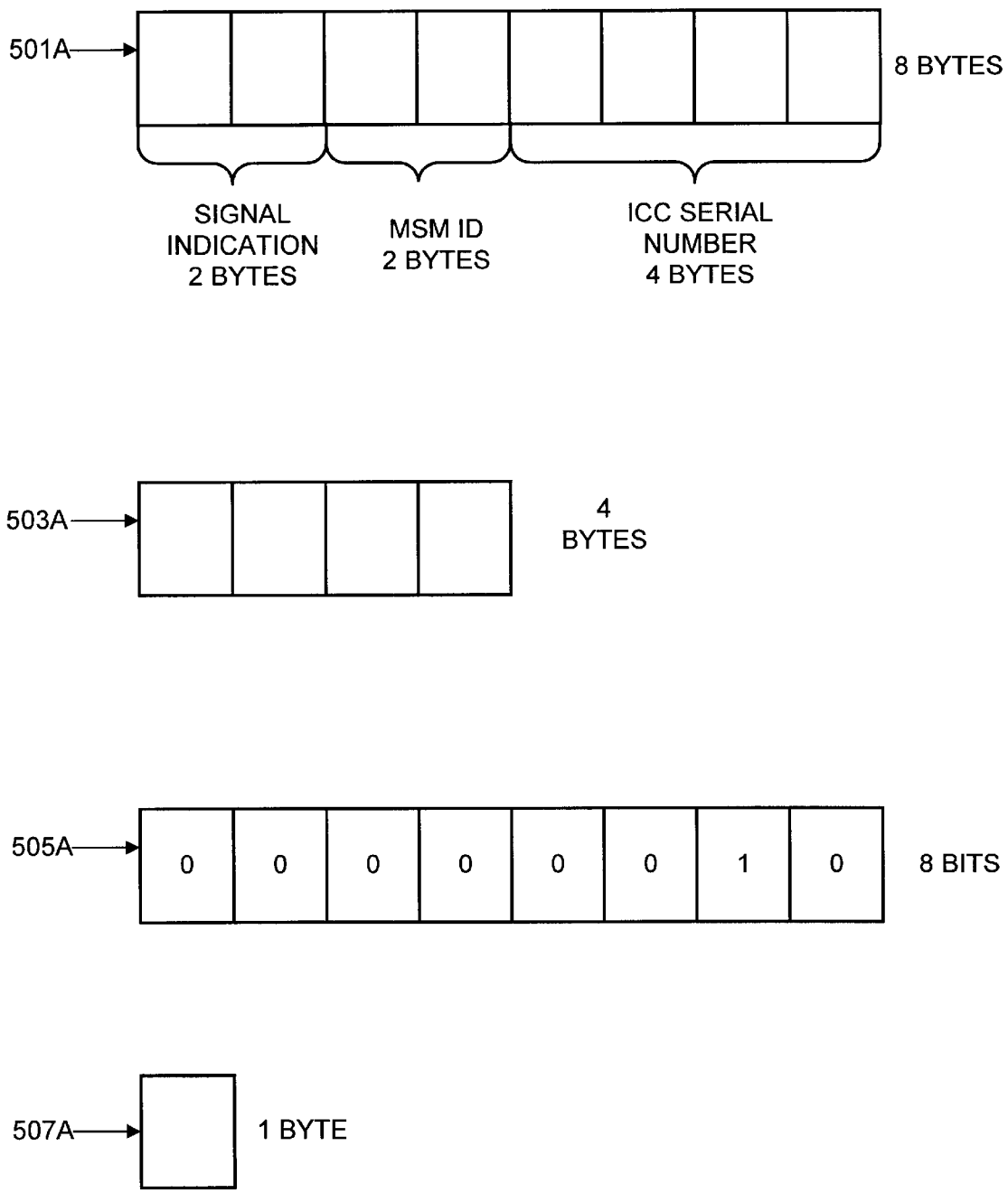
FIG. 5A is a schematic of the data structures residing in an IC card and representing personalization data.

FIG. 5 shows the steps of generating and loading the four elements of the card personalization data into the memory of the IC cards, and FIG. 5A shows a schematic of bit maps for each identity field residing in the memory of an IC card containing personalization data in accordance with the present invention. Each data structure for each identity field has its own descriptor code. Step 501 loads the data structure for the identity field "card ID" called "msm_mcd_ permissions_mcd_no." This nomenclature stands for MULTOS system manager_MULTOS card device_ permissions_MULTOS card device number. Although this number is typically 8 bytes long as shown in FIG. 5A, the data could be any length that indicates a unique number for the card. In the preferred embodiment, 2 bytes are dedicated as a signal indicator, 2 bytes comprise a MULTOS Injection Security Module ID (MISM ID) indicating which security module injected the card with its injected keys when it was manufactured, and 4 bytes comprise an Integrated Circuit Card (ICC) serial number which identifies the individual card produced at the particular MISM.

Step 503 loads the data structure for the identity field "issuer ID" called "msm_mcd_permissions_mcd_ issuer_id." This nomenclature stands for a MULTOS card device issuer identification number. Each card issuer (such as a particular bank, financial institution or other company involved with an application) will be assigned a unique number in the card system. Each IC card in the MULTOS system will contain information regarding the card issuer which personalized the card or is responsible for the card. A card issuer will order a certain number of cards from a manufacturer and perform or have performed the personalization process as described herein. For example, a regional bank may order 5,000 cards to be distributed to its customers. The "mcd_issuer_id" data structure on these cards will indicate which issuer issued the cards. In the preferred embodiment, the data structure is 4 bytes long (as shown in FIG. 5A at 503A) to allow for many different issuers in the system although the length of the data structure can vary with the needs of the card system.

Step 505 loads the data structure for the identity field "product ID" called "msm_mcd_permissions_mcd_ issuer_product_id." This nomenclature stands for MULTOS card device issuer product identification number. Each card issuer may have different classes of products or cards which it may want to differentiate. For example, a bank could issue a regular credit card with one product ID, a gold credit card with another product ID and a platinum card with still another product ID. The card issuer may wish to load certain applications onto only one class of credit cards. A gold credit card user who pays an annual fee may be entitled to a greater variety of applications than a regular credit card user who pays no annual fee. The product ID field identifies the card as a particular class and will later allow the card issuer to check the product ID and only load applications onto cards which match the desired class.

Another way to differentiate products is by application type, such as by categorizing the application as financial, legal, medical and/or recreational, or by assigning particular applications to a group of cards. For example, one card issuer may have different loyalty programs available with different companies to different sets of card users. For example, a bank may have an American Airlines® loyalty program and a British Airways® loyalty program for different regions of the country dependent on where the airlines fly. The product type allows the issuer to fix the product classification of the card during the personalization process. When loading applications onto the card, the product type identification number on each card will be checked to make sure it matches the type of card onto which the issuer desires to load. The product type data structure is preferably an indexing mechanism (unlike the other personalization data structure) of 8 bits (as shown at 505A in FIG. 5A) but could be any length depending upon the needs of the card system. In the illustrated embodiment, the resulting instruction would be to locate the second bit (since the byte's indicated value is 2) in the array to be searched (see discussion of step 809 below).

Step 507 loads the data structure for the identity field data called "msm_mcd_permissions_mcd_controls_data_ date." This nomenclature stands for the MULTOS card device controls data date or, in other words, the date on which the card was personalized so that, for example, the application loader can load cards dated only after a certain date, load cards before a certain date (e.g., for application updates) or load cards with a particular data date. The information can include the year, month and day of personalization or may include less information, if desired. The data_date data structure is preferably 1 byte in length (see 507A in FIG. 5A) although it could be any length depending upon the needs of the particular card system used.

Once all of the personalization data structures are loaded and stored in the card, the card has been identified by issuer, product class, date and identification number (and other data fields, if desired), and the card cannot change its identity; these fields cannot be changed in the memory of the card. If a card user wants to change the product_id stored in the card to gain access to different applications available to another product type, a new card will have to be issued to the user containing the correct personalization data. This system is consistent with a gold card member receiving a new card when the classification is changed to platinum.

After the card has been enabled and personalized by storing its individual card key set, MSM personalization characteristics and enablement bit as described in FIG. 3, the card is ready to have applications loaded into its memory.

Loading Applications

The application loading process contains a number of security and card configuration checks to ensure the secure and proper loading of an application onto the intended IC card. The application loading process is preferably performed at the personalization bureau so that the card will contain one or more applications when the card is issued. The card may contain certain common applications which will be present on every card the issuer sends out, such as an electronic purse application or a credit/debit application. Alternatively, the personalization bureau could send the enabled cards to a third party for the process of loading applications. The multiple application operating system stored in the ROM of each card and the card MSM personalization data is designed to allow future loading and deleting of applications after the card has been issued depending upon the desires of the particular card user and the responsible card issuer. Thus, an older version of an application stored on the IC card could be replaced with a new version of the application. An additional loyalty application could also be added to the card after it has been initially sent to the card user because the application is newly available or the user desires to use the new application. These loading and deleting functions for applications can be performed directly by a terminal or may be performed over telephone lines, data lines, a network such as the Internet or any other way of transmitting data between two entities. In the present IC card system, the process of transmitting the application program and data ensures that only IC cards containing the proper personalization data and which fit on application permissions profile will be qualified and receive the corresponding application program and data.

Figure 6:
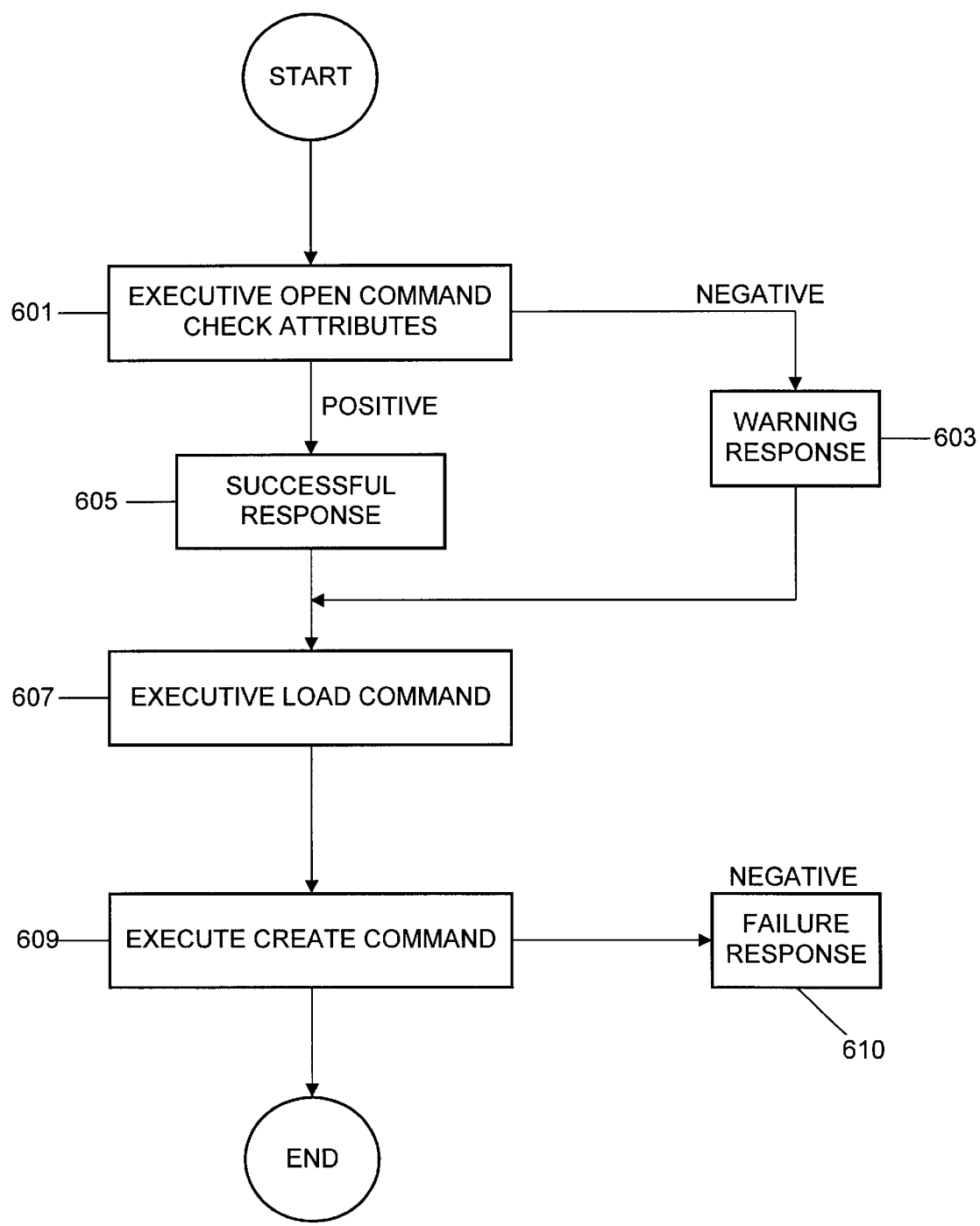
FIG. 6 is a flowchart illustrating the steps of loading an application onto an IC card in the secure system.

FIG. 6 shows the preferred steps performed in loading an application onto an IC card in the MULTOS IC card system. For this example, the personalization bureau is loading an application from a terminal which enabled the same card. Step 601 performs an "open command" initiated by the terminal which previews the card to make sure the card is qualified to accept the loading of a specific application. The open command provides the card with the application's permissions data, the application's size, and instructs the card to determine (1) if the enablement bit is set indicating the card has been personalized; (2) whether the application code and associated data will fit in the existing memory space on the card; and (3) whether the personalization data assigned to the application to be loaded allows for the loading of the application onto the particular card at issue. The open command could also make additional checks as required by the card system. These checking steps during the open command execution will be described in detail in conjunction with FIG. 7.

After the open command has been executed, the application loader via the terminal will be advised if the card contains the proper identification personalization data and if enough room exists in the memory of the card for the application code and related data. If there is insufficient memory, then a negative response is returned by the card and the process is abended (abnormally ended). If the identification personalization data does not match the applications permissions data, a warning response is given in step 603, but the process continues to the load and create steps. Alternatively, if there is no match, the process may automatically be abended. If a positive response is returned by the card to the terminal in step 605, the application loader preferably proceeds to next steps. The open command allows the application to preview the card before starting any transfer of the code and data.

Step 607 then loads the application code and data onto the IC card into EEPROM. The actual loading occurs in conjunction with create step 609 which completes the loading process and enables the application to execute on the IC card after it is loaded. The combination of the open, load and create commands are sent by the terminal, or another application provider source, to the IC card to perform the application loading process. The operating system in the IC cards is programmed to perform a specific set of instructions with respect to each of these commands so that the IC card will communicate with and properly carry out the instructions from the terminal.

Step 609 performs the create command which at least: (1) checks if an application load certificate is signed (encrypted) by the CA and therefore authenticates the application as a proper application for the system; and (2) checks the card personalization data stored on the card against the permissions profile for the application to be loaded to qualify the card for loading. It may do other checks as required. If one of the checks fails, then a failure response 610 is given and the process aborts. The application after it has passed these checks will be loaded into the memory of the card.

Figure 7:
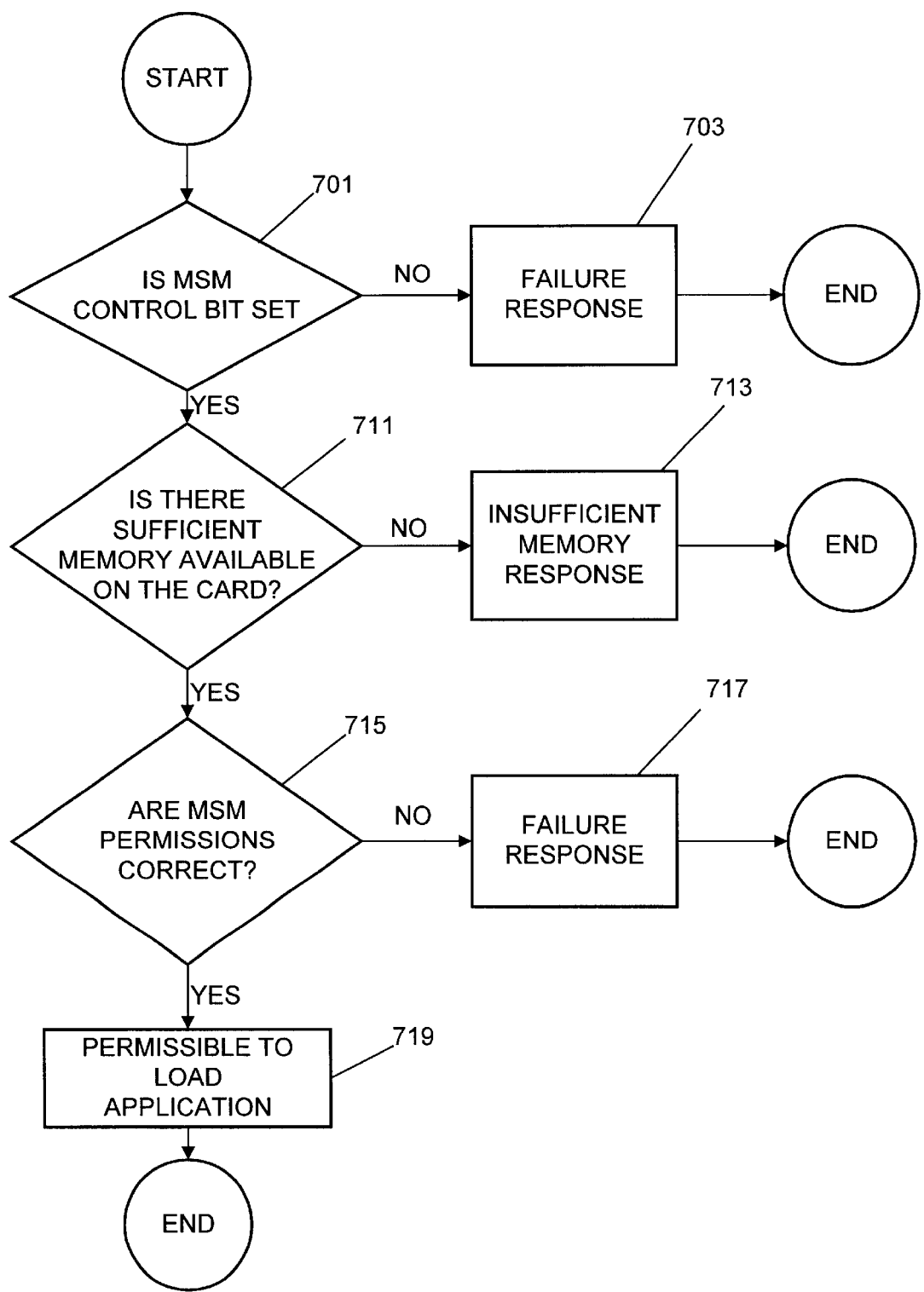
FIG. 7 is a flow chart illustrating the checking steps as indicated in block 601 of FIG. 6.

FIG. 7 shows the various steps of the open step 601 of FIG. 6 in more detail. Step 701 determines if the enablement (i.e., control) bit is set. This bit is set when the card has completed its personalization process and has been assigned its personalization data. An application can be loaded on an IC card in the card system only if the card contains the personalization data. If the enablement bit is not set, the card has not been personalized and therefore the card returns a negative response 703 to the terminal. If the enablement bit is set, then the card has been enabled and the test conditions continue with step 711.

Step 711 checks if there is sufficient space in the memory on the card to store the application code and its associated data. Applications will typically have associated data related to their functions. This data will be used and manipulated when the application is run. Storage space in the memory of an IC card is a continuing concern due to the relatively large physical space required for EEPROM and how it fits in the integrated circuit which is desired to be small enough to fit on a credit card sized card. An example of the size of a preset EEPROM on an IC card is 16K bytes although the actual size varies. Applications can range from 1K byte or less for a very simple application up to the size of available memory for a more sophisticated application. The data associated with an application can range from no data being stored in the card memory to a size constrained by the amount of available memory. These varied sizes of application code and data continually increase as applications become more advanced and diverse.

MULTOS as an operating system is not limited by the number of applications and associated data it can store on the card. Thus, if five applications can fit in the available memory of the card, the card user will have greatly increased functionality than if one or two applications were stored on the card. Once a card's memory is filled to its capacity, however, a new application cannot be loaded onto the card unless another application including its code and data of sufficient size can be deleted. Therefore, checking the amount of available space on the card is an important step. If there is not sufficient space, then an insufficient space response 713 will be returned to the terminal. The application loader can then decide if another existing application on the card should be deleted to make room for the new application. Deletion depends upon the card issuer having an application delete certificate from the CA. If there is sufficient space on the card, then the process continues with step 715.

An example of the testing of memory spaces in step 711 is now described. The numbers used in this example in no way limit the scope of the invention but are used only to illustrate memory space requirements. An IC card may have 16K available EEPROM when it is first manufactured. The operating system data necessary for the operating system may take up 2K of memory space. Thus, 14K would remain. An electronic purse application's code is stored in EEPROM and may take up 8K of memory space. The purse application's required data may take up an additional 4K of memory space in EEPROM. The memory space which is free for other applications would thus be 2K (16K−2K−8K−4K= 2K). If a card issuer wants to load a credit/debit application whose code is 6K bytes in size onto the card in this example, the application will not fit in the memory of the IC card. Therefore, the application cannot load the new application without first removing the purse application from the card. If a new credit/debit application was loaded into EEPROM of the IC card, then it would have to overwrite other application's code or data. The application loader is prevented from doing this.

Figure 8:
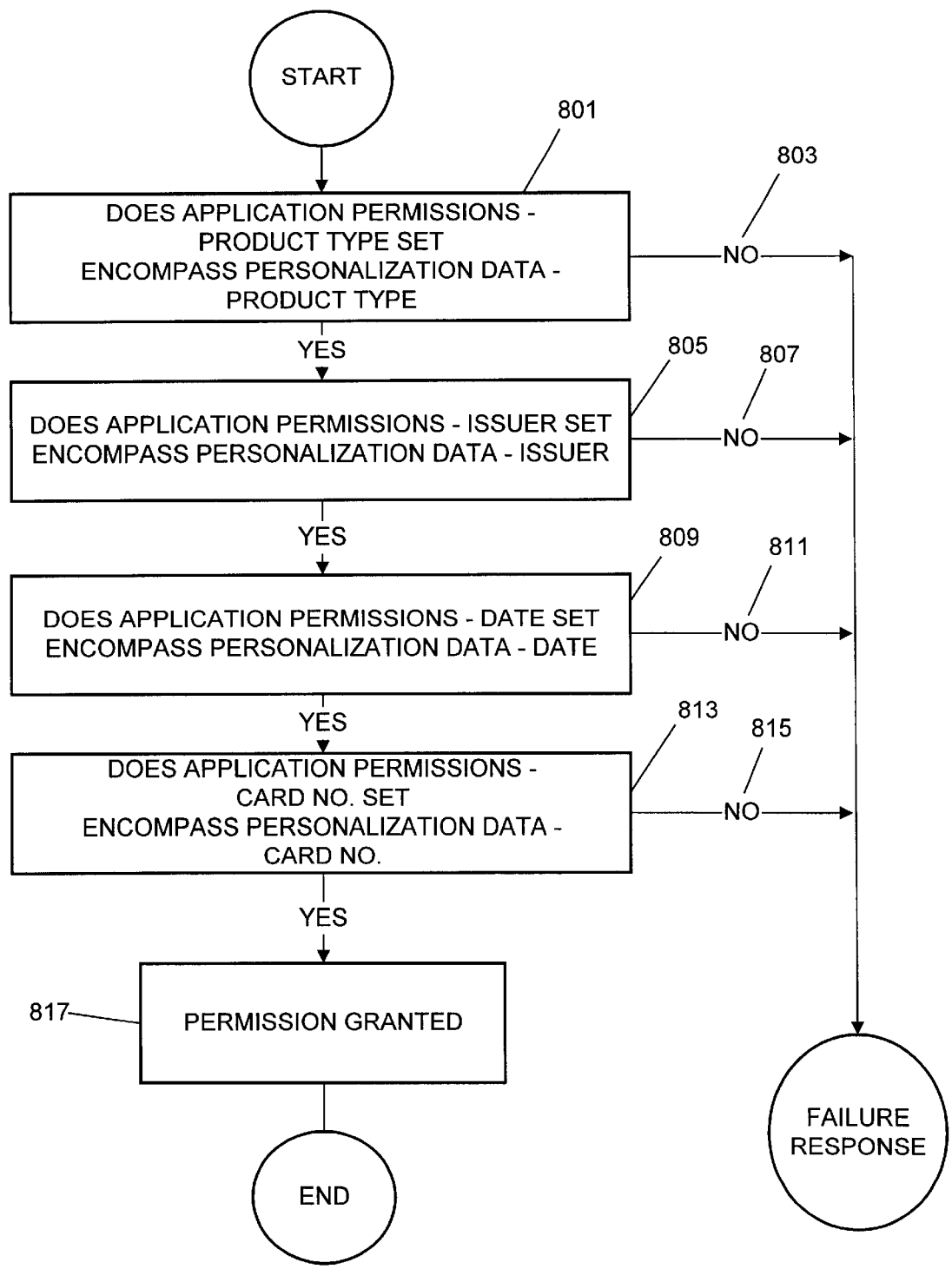
FIG. 8 is a flowchart illustrating the steps undertaken in determining if loading of an application may proceed.

FIG. 8 shows the steps performed in determining whether the card's personalization data falls within the permissible set of cards onto which the application at issue may be loaded. These steps are preferably performed during the execution of the "create" command. However, these steps may be performed at any time during the loading or deleting of an application. As described previously, the card is personalized by storing data specific to the card (MSM personalization data) including: a card ID designation specific to an individual card, the card issuer number indicating the issuer of the card, the product type of the card, such as a gold or platinum card, and the date the card was personalized. This data uniquely identifies the card apart from all other IC cards in the system.

Accordingly, applications can be selectively stored on individual cards in the IC card system on virtually any basis, including the following. An application can be loaded selectively to cards containing one or more specific card numbers. An application can be selectively loaded on one or more cards containing a specified card issuer ID. Moreover, an application can be loaded only upon one type of product specified by the particular card issuer, and/or the application can be loaded only on cards which have a specified date or series of dates of personalization. Each of the personalization data allows an application to be selectively loaded onto certain cards or groups of cards and also ensures that cards without the proper permissions will not receive the application. Personalization data types in addition to the four described can also be used as needed.

The selection of IC cards upon which a particular application may be loaded is made possible by the use of "applications permissions data" which is assigned to the application and represents at least one set of cards upon which the application may be loaded. The set may be based on virtually any factor, including one or more of the following: card numbers, card issuers, product types or personalization dates. Although the individual card's personalization data typically identify one specific number, one card issuer, one product type and one date, the application's permissions data may indicate a card number or a blanket permission, a card issuer or a blanket permission, and a number of product types and dates.

For example, a frequent loyalty program may be configured to allow its loading and use on cards in different product classes belonging to one card issuer. In addition, the application permissions data may indicate that the loyalty program can be used on gold and platinum product types if the card was issued after May, 1998. Thus, the MSM permissions check will determine if the card's individual personalization data is included in the allowed or permissible set of cards upon which the application may be loaded. If it is, the application will be loaded.

To expedite the comparison process, an alternative embodiment may include setting one or more permissions data at zero representing a blanket permission for that particular data. For instance, by placing a zero for the "card number" entry in the application permissions data or some other value indicating that all cards may be loaded regardless of their number, the system knows not to deny any cards based on their card number. Moreover, if a zero is placed in the application's permissions data "issuer ID," then all cards similarly will pass the "issuer" test comparison. This feature allows greater flexibility in selecting groups of cards. The zero indicator could also be used for other permissions data, as required.

Referring to FIG. 8, each of the permissions data is checked in the order shown, but other orders could be followed because if any one of the permissions fails, the application will be prevented from being loaded on the IC card being checked. The permissions are preferably checked in the order shown. Step 801 checks if the application permissions product type set encompasses the card's product type number stored in the memory of the card. Each card product type is assigned a number by the system operator. The product types are specified for each card issuer because different card issuers will have different product types. The cards are selectively checked to ensure that applications are loaded only on cards of authorized product type. The application permissions product type set can be 32 bytes long which includes multiple acceptable product types or can be a different length depending upon the needs of the system. Using data structure 505A as an example, the operating system would check bit number 2 in the 256 bit array (32 bytes×8 bits per byte) resulting from the 32 byte long application permissions data structure. If the permissions check fails, then the card returns a failure message to the terminal in step 803. If the product type check passes (for example, the value of bit no. 2 being 1), then the process continues with step 805.

Step 805 checks if the application permissions allowable card issuer number set encompasses the card's issuer number stored in the memory of the card or if the application permissions issuer data is zero (indicating all cards pass this individual permissions check). Each card issuer is assigned a number by the system operator and the cards are selectively checked to ensure that applications are loaded only on cards distributed by authorized card issuers. The application permissions card issuer number set can be 4 bytes long if one issuer is designated or can be longer depending upon the needs of the system. If the issuer check fails, then the card returns a failure message to the terminal in step 807. If the check passes, then the process continues with step 809.

Step 809 checks if the application permissions date set encompasses the card's data date stored in the memory of the card. The date that the IC card was personalized will be stored and will preferably include at least the month and year. The cards are selectively checked to ensure that applications are loaded only on cards with the authorized personalization date. The application permissions date set can be 32 bytes long which includes multiple dates or can be a different length depending upon the needs of the system. If the date permissions check fails, then the card returns a failure message to the terminal in step 811. If the date check passes, then the process continues with step 813.

Step 813 checks if the application permissions allowable card number set encompasses the card's ID number stored in the card memory or if the application permissions allowable card number data is zero (indicating all cards pass this individual permissions check). The testing of the permissions is performed on the card during the execution of the open, load and create commands. The application permissions card number data set can be 8 bytes long if one number is designated or can be longer depending upon the needs of the system. If the card number check fails, then the card returns a failure message to the terminal in step 815. If the check passes, then the process continues with step 817.

Summary of IC Card System's Process

Figure 9:
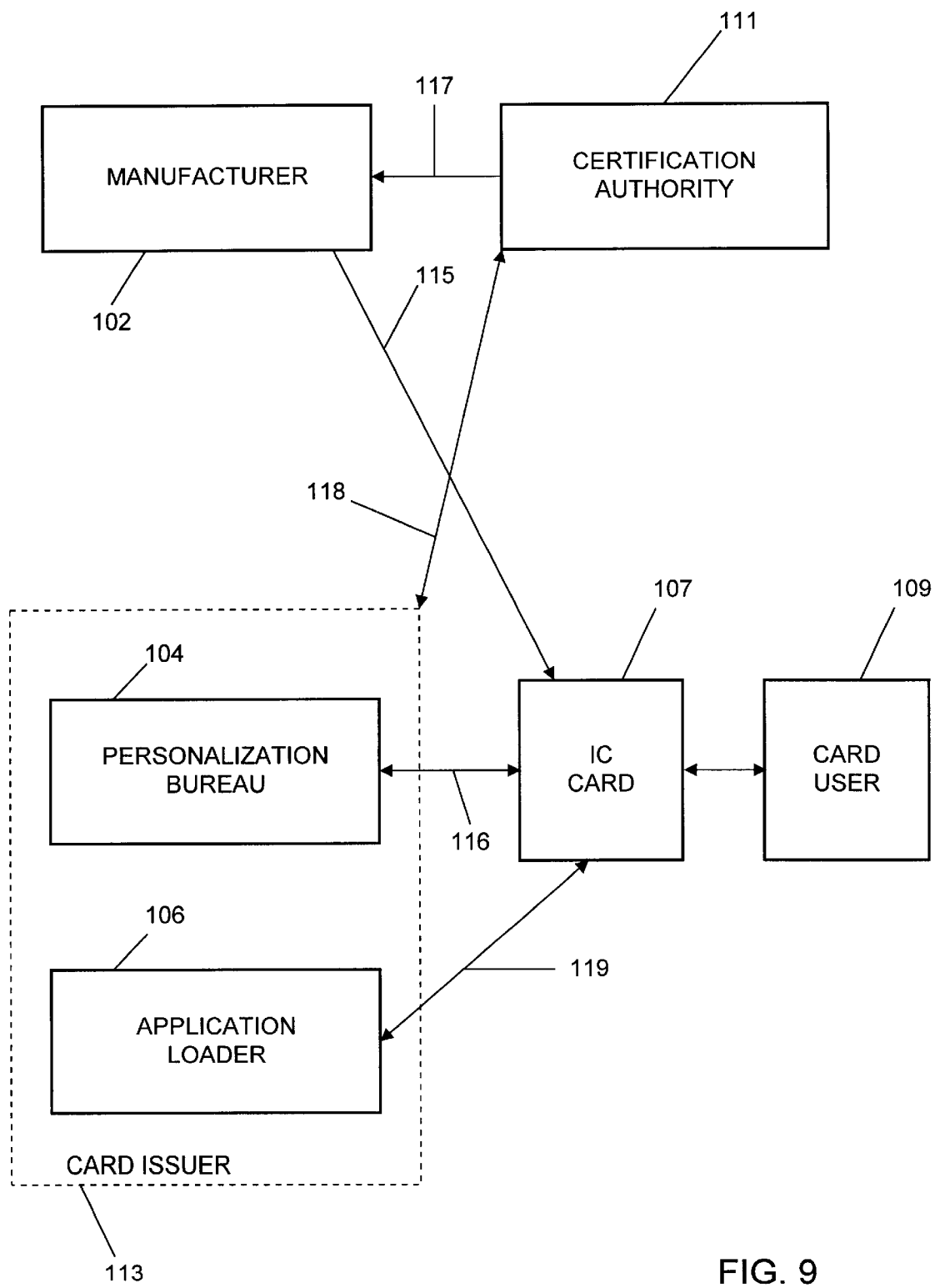
FIG. 9 is a block diagram showing the components of the system architecture for the enablement process of an IC card in a secure multi-application IC card system.

FIG. 9 shows the components of the system architecture for the card initialization process of an IC card in a secure multiple application IC card system. The system includes a card manufacturer 102, a personalization bureau 104, an application loader 106, the IC card 107 being initialized, the card user 109 and the certification authority 111 for the entire multiple application secure system. The card user 131 is the person or entity who will use the stored applications on the IC card. For example, a card user may prefer an IC card that contains both an electronic purse containing electronic ash (such as MONDEX™) and a credit/debit application (such as the MasterCard® EMV application) on the same IC card. The following is a description of one way in which the card user would obtain an IC card containing the desired applications in a secure manner.

The card user would contact a card issuer 113, such as a bank which distributes IC cards, and request an IC card with the two applications both residing in memory of a single IC card. The integrated circuit chip for the IC card would be manufactured by manufacturer 102 and sent to the card issuer 113 (or an entity acting on its behalf) in the form of an IC chip on a card. As discussed above (see steps 201–209), during the manufacturing process, data is transmitted 115 via a data conduit from the manufacturer 102 to card 107 and stored in IC card 107's memory. (Any of the data conduits described in this figure could be a telephone line, Internet connection or any other transmission medium.) The certification authority 111, which maintains encryption/decryption keys for the entire system, transmits 117 security data (i.e., global public key) to the manufacturer over a data conduit which is placed on the card by the manufacturer along with other data, such as the card enablement key and card identifier. The card's multiple application operating system is also stored in ROM and placed on the card by the manufacturer. After the cards have been initially processed, they are sent to the card issuer for personalization and application loading.

The card issuer 113 performs, or has performed by another entity, two separate functions. First, the personalization bureau 104 personalizes the IC card 107 in the ways described above, and second, the application loader 106 loads the application provided the card is qualified, as described.

Regarding personalization, an individualized card key set is generated by the CA and stored on the card (see FIG. 3). The card is further given a specific identity using MSM personalization (see FIG. 3, step 307 and FIG. 5) including a card ID number, an issuer ID number identifying the card issuer which processed the card, a card product type number which is specified by the card issuer and the date upon which the personalization took place. After the card has been personalized, applications need to be loaded onto the card so that the card can perform desired functions.

The application loader 106, which could use the same terminal or data conduit as personalization bureau 104, first needs to have determined if the card is qualified to accept the application. This comparison process takes place on the card itself (as instructed by its operating system) using the permissions information. The card, if it is qualified, thus selectively loads the application onto itself based upon the card's identity and the card issuer's instructions. The application loader communicates 119 with the IC card via a terminal or by some other data conduit. After the applications have been loaded on the card, the card is delivered to the card user 109 for use.

The secure multiple application IC card system described herein allows for selective loading and deleting of applications at any point in the life cycle of the IC card after the card has been personalized. Thus, a card user could also receive a personalized card with no applications and then select a desired application over a common transmission line such as a telephone line or Internet connection.

Figure 10:
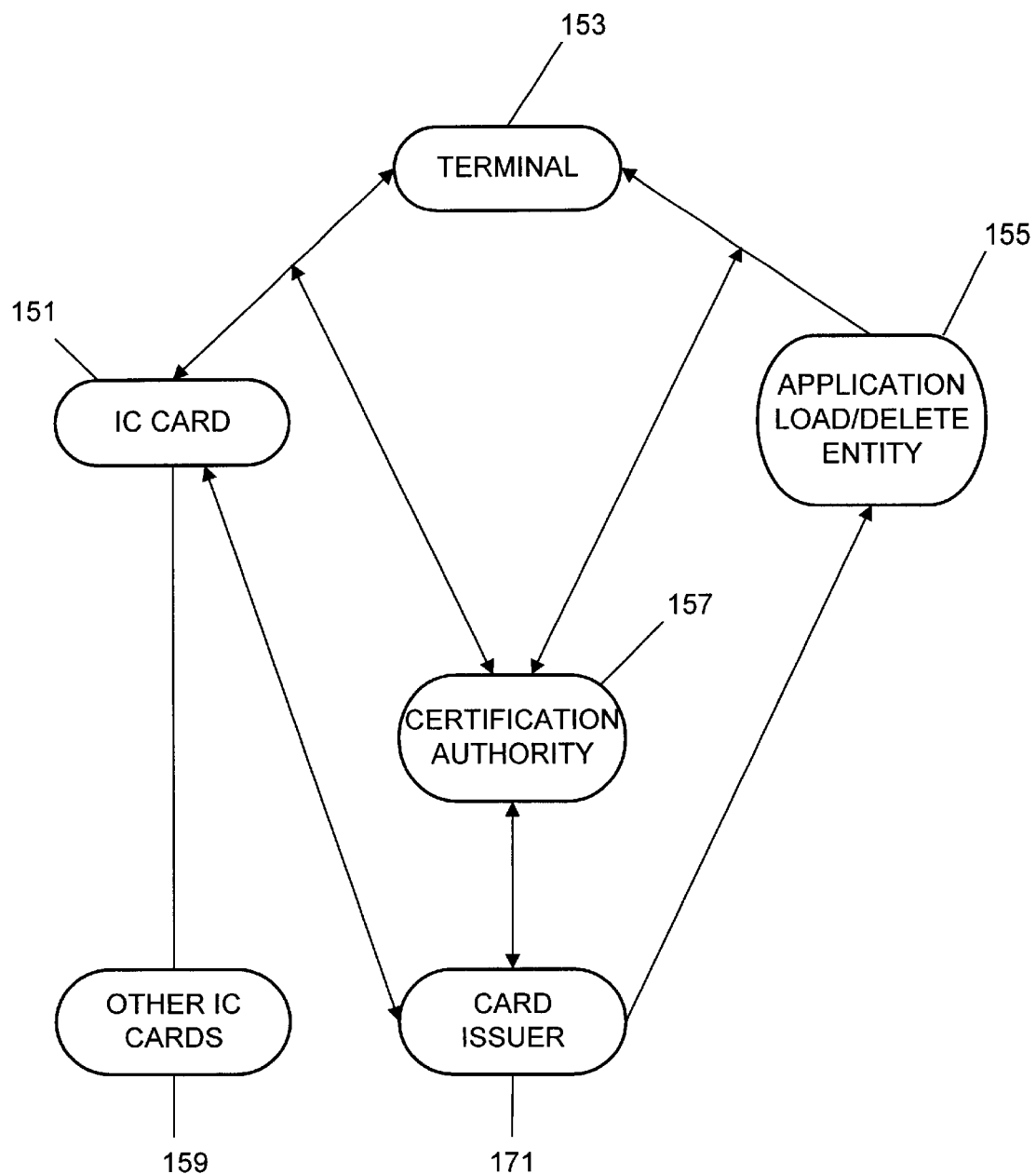
FIG. 10 is a system diagram of entities involved with the use of the IC card once it has been personalized.

FIG. 10 is a system diagram of entities involved with the use of an IC card once it has been personalized. The system includes an IC card 151, a terminal 153, an application load/delete entity 155, the certification authority 157, a card issuer 171 and other IC cards 159 in the system. The arrows indicate communication between the respective entities. The CA 157 facilitates loading and deleting of applications. After providing the MSM permissions data and card specific keyset to the card during card enablements, the CA allows applications to be later loaded and deleted preferably by issuing an application certificate. Application specific keys are required to authenticate communication between a card and terminal. The IC card 151 also can communicate with other IC cards 159. Card issuer 171 is involved with all decisions of loading and deleting applications for a card which it issued. All communications are authenticated and transmitted securely in the system.

For instance, IC card 151 will use the following procedure to load a new application onto the card. IC card 101 is connected to terminal 153 and the terminal requests that an application be loaded. Terminal 153 contacts application load/delete entity 155 which, as a result and in conjunction with card issuer 171, sends the application code, data and application permissions data (along with any other necessary data) to terminal 153. Terminal 153 then queries card 151 to ensure it is the correct card onto which the application may be loaded. If IC card passes the checks discussed above, the application is loaded onto card 151. The CA 157 provides the application load or delete certificate that enables the application to be loaded or deleted from the card. This example shows one way to load the application, but other variations using the same principles could be performed, such as directly loading the application at the application load/delete entity 155.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, it will be appreciated that the MSM personalization and permissions data may not only be used for loading applications onto IC cards but also for deleting applications from said cards. The same checks involving MSM permissions and loading applications are made for deleting applications. A delete certificate from the CA authorizing the deletion of an application will control from which cards the application may be deleted. This is accomplished through the personalization data stored on each IC card and the permissions check as described herein.

Moreover, the data may also be applicable to personal computers or other units onto which applications may be loaded which are not physically loaded on cards. In addition, the application's permissions data may actually include data representative of a set or sets of cards to be excluded, instead of included—cards that cannot be loaded with the application.

We claim:

1. An IC card system comprising at least one IC card and an application, wherein said IC card contains personalization data representative of that card and said application is assigned a permissions data set representing at least one IC card upon which said application may be loaded, said system further comprising means for determining whether said personalization data falls within said permissions data set, wherein said permissions data set includes all IC cards which attempt to load the application.

* * * * *

UNITED STATES PATENT AND TRADEMARK OFFICE
CERTIFICATE OF CORRECTION

PATENT NO. : 6,575,372 B1  Page 1 of 1
DATED : June 10, 2003
INVENTOR(S) : Everett et al.

It is certified that error appears in the above-identified patent and that said Letters Patent is hereby corrected as shown below:

Title page,
Item [63], Related U.S. Application Data, "May 14," should read -- May 15, --
Item [56], References Cited, FOREIGN PATENT DOCUMENTS, insert
-- WO    WO9116691    10/1991 --

Column 1,
Line 19, "mircroprocessor" should read -- microprocessor --

Column 6,
Line 60, "fuisible" should read -- fusible --

Signed and Sealed this

Twenty-fifth Day of November, 2003

JAMES E. ROGAN
*Director of the United States Patent and Trademark Office*